Feb. 7, 1928. Re. 16,876

L. L. POSTON

ARTIFICIAL TOOTH

Original Filed April 28, 1917

Inventor
Leon Leroy Poston

By Irvin S. Clarkson

Attorney

Reissued Feb. 7, 1928. Re. 16,876

UNITED STATES PATENT OFFICE.

LEON L. POSTON, OF FORT MYERS, FLORIDA, ASSIGNOR TO THE COLUMBUS DENTAL MANUFACTURING CO., OF COLUMBUS, OHIO, A CORPORATION OF OHIO.

ARTIFICIAL TOOTH.

Original No. 1,338,959, dated May 4, 1920, Serial No. 165,135, filed April 28, 1917. Application for reissue filed April 27, 1927. Serial No. 187,085.

My invention relates to improvements in artificial teeth in which a replaceable tooth facing and base is used in connection with a metal backing with a biting surface; and the objects of my improvement are:

1st. To provide a suitable backing having a biting edge or surface adapted to be inserted in the proper bridge work and a porcelain facing having a full base which can be removed or slipped off from the backing.

2nd. To provide such a backing and biting surface that will be strong and to which the facing and base of porcelain can be fitted and attached after the bridge is in place.

3rd. To provide a porcelain tooth that can be replaced upon a bridge without removing the bridge.

4th. To provide such an artificial tooth that the porcelain facing and base can be removed or attached without altering the biting surface.

5th. To provide such a porcelain tooth that the base of porcelain comes in contact with the gum of the mouth and not the metal and yet providing a metal biting edge or incisal surface.

6th. To provide such a surface and backing that the said backing may be constructed by separately casting the backing or by running solder on a thin plate that has been fitted to the entering surfaces without heating the porcelain.

I attain these objects by the structure illustrated in the accompanying drawing in which—

Figure 1:
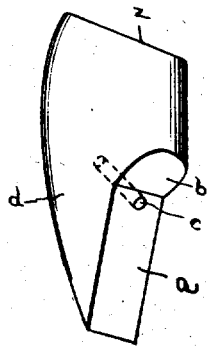
Figure 2:
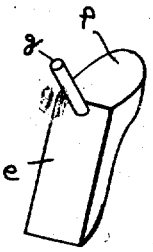
Figure 3:
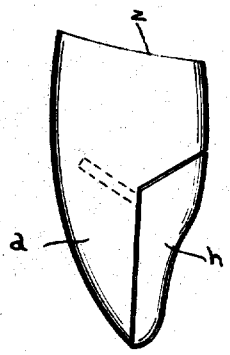
Figure 4:
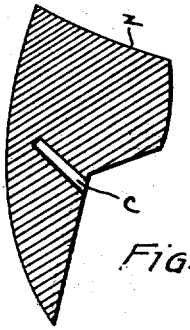
Figure 5:
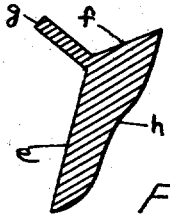
Figure 6:
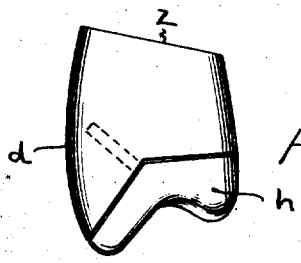

Figure 1 is a perspective view of the porcelain facing and base; Fig. 2 is a perspective view of the metal backing; Fig. 3 is a perspective view of the porcelain tooth with the backing in place; Fig. 4 is a vertical cross section of the porcelain facing; Fig. 5 is a vertical cross section of the backing; Fig. 6 is a side elevation of a finished tooth of the bicuspid or molar type.

Similar letters refer to similar parts throughout the several views:

A porcelain tooth *d* of any proper shape is employed having a full base *z*. This porcelain tooth *d* is cut away by entering surfaces as *a*, *b* from a point at a suitable distance above what would be the incisal edge or cutting surface of the tooth and extending out to a point below the finished base to the tooth. Into this porcelain facing having the base *z* is a socket *c*, which socket is made of uniform cross section and is preferably circular though it may take a square or triangular form, depending upon the desired shape of the pin *g* hereafter referred to.

A suitable metal tooth backing *h* is employed having outwardly extending surfaces *e* and *f*. These surfaces are adapted to fit to the surfaces in the porcelain tooth as *a*, *b*, preferably the surfaces *a*, *b* form an obtuse plain angle. When the surfaces on the porcelain tooth form an obtuse entrant plain angle as *a* and *b*, a corresponding plain angle is formed on the backing *h* by the surfaces *e* and *f* respectively. At the outermost projection of the surfaces *e* and *f* a suitable pin *g* is extended which may be of the same metal as the backing *h* but which preferably may be cast, welded or soldered into the backing *h* and made of a less expensive or suitable metal. The socket *c* is so placed with respect to the surfaces *a*, *b* or *a'*, *b'* as to receive the pin *g* when the surfaces *e* and *f* respectively are in contact with the said surfaces *a*, *b* respectively. The pin *g* may be, depending upon the character of the socket *c*, of any suitable cross section but is preferably used in the round form. The pin *g* is adapted to be cemented into the socket *c*. The base *z* of the porcelain facing *d* is made full and of such suitable shape that it may be ground away and fitted and may take the form as indicated at *z* to fit the contour of the gums of the mouth coming down against it.

The full base *z* of the facing *d* is extended over the backing *h* so that the gums of the mouth never come in contact with the backing *h* and the facing *d* is so cut away that the backing *h* always forms the incisal or biting edge of the tooth.

In the development of the art of dentistry a backing adapted to be soldered into the bridge in connection with other teeth has long been employed having a porcelain face or tooth partially covering the same and adapted to show outwardly in imitation of the natural teeth.

Some forms of the facings have been made detachable and replaceable and the backing *h* is adapted to be attached and fused or soldered into bridge work and is so constructed that no portion of it ever comes in contact with the gums and that it receives the biting force against it, having a portion formed into an incisal or biting surface. By forming extending surfaces on the backing *h* as *e* and *f* and a pin *g* at the outermost projection of said surfaces, I find that a porcelain facing *d* having surfaces *a* and *b* fitted to the surfaces *e* and *f* respectively and the socket *c* adapted to receive the pin *g* can be readily fitted by properly forming the base *a* to fit the gums at proper distance and cemented rigidly and securely to the backing *h* forming the artificial tooth with a full base protecting the metal backing from the gums and having a metal incisal surface. The employment of the surfaces at an obtuse angle as *e* and *f* and the pin *g* on the backing *h* and the corresponding surfaces *a* and *b* respectively and the socket *c* enables the porcelain facing *d* to be placed upon the backing *h* without moving the same to any extent vertically with the backing *h* and such facing *d* is applied directly from the outside of the bridge. After the porcelain facing *d* is made the pin *g* of any suitable metal may be inserted in the socket *c* a wax backing may be formed upon the porcelain facing *d* conforming to the shape of the desired metal backing *h*, then the wax pattern with the pin *g* may be removed and molded and a metal backing *h* cast with the pin *g* cast therein. The metal backing *h* is then inserted in the proper bridge and the bridge may be placed in place in the mouth and the porcelain facing *d* and base *a* fitted and attached to the bridge on the backing *h* without removing the bridge or the backing *h*. If the facing *d* or base *a* becomes injured, discolored, or if it improperly fits the gum of the mouth it may be removed from the backing *h* without removing the bridge and replaced by another by cementing the pin *g* into the socket *c* and the surfaces of the porcelain and the backing *h* together.

I am aware that prior to my invention porcelain facings for artificial teeth have been employed and that various replaceable facings have been heretofore used in connection with metal backings, which backings were adapted to be fastened together in suitable bridges or frames in the mouth, but what I claim and desire to secure by Letters Patent is:

1. In an artificial tooth, a replaceable porcelain facing having a full base; inwardly projecting surfaces in said porcelain facing extending from above the biting edge to a point below the base; a socket of uniform cross section extending into said facing; a metal backing having a biting surface; surfaces outwardly formed on said backing adapted to fit the inwardly formed surfaces on said replaceable facing, and a pin extending from near the outermost portion of said outwardly extending surfaces on said metal backing and adapted to enter said socket in said replaceable facing.

2. An artificial tooth including a replaceable porcelain facing, having a full base extending from the front to the rear face of the facing, and provided with an angular recess having a front wall and a top wall extending upwardly and rearwardly, said front and top walls of the recess being arranged at an obtuse angle to each other, and the said facing being provided at the angle of the said recess with an inclined socket extending upwardly and forwardly at an inclination and arranged at an obtuse angle to each of said walls, a metal backing provided at the bottom with a biting surface arranged to receive the entire strain of mastication, said metallic backing having an inclined front and top face arranged at an obtuse angle to each other and fitting the walls of the recess of the said facing, and an inclined pin extending upwardly and forwardly from the metallic backing at the angle formed by the said inclined faces thereof and arranged at an obtuse angle to each of the same, said pin fitting in the socket of the facing and permitting the said facing to be placed on and removed from the pin without disturbing the bridge or other mounting in which the metallic backing may be arranged.

In testimony whereof I affix my signature.

LEON L. POSTON.